US012686083B2

(12) United States Patent (10) Patent No.: US 12,686,083 B2
Tu et al. (45) Date of Patent: Jul. 21, 2026

(54) SOLDER ALLOY COMPOSITION, ITS PREPARATION METHOD AND USES IN ROOM-TEMPERATURE RAPID SOLID-STATE SOLDERING

(71) Applicant: CITY UNIVERSITY OF HONG KONG, Kowloon (HK)

(72) Inventors: King-Ning Tu, Kowloon (HK); Yingxia Liu, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 410 days.

(21) Appl. No.: 18/333,253

(22) Filed: Jun. 12, 2023

(65) Prior Publication Data

US 2024/0009777 A1 Jan. 11, 2024

Related U.S. Application Data

(60) Provisional application No. 63/388,125, filed on Jul. 11, 2022.

(51) Int. Cl.
| | |
|---|---|
| *B23K 35/26* | (2006.01) |
| *B22F 1/054* | (2022.01) |
| *B22F 3/10* | (2006.01) |
| *B22F 9/06* | (2006.01) |
| *B23K 35/02* | (2006.01) |
| *C22C 1/04* | (2023.01) |
| *C22C 28/00* | (2006.01) |
| *C22C 30/00* | (2006.01) |

(52) U.S. Cl.
CPC .............. *B23K 35/26* (2013.01); *B22F 1/056* (2022.01); *B22F 3/10* (2013.01); *B22F 9/06* (2013.01); *B23K 35/0244* (2013.01); *C22C 1/04* (2013.01); *C22C 28/00* (2013.01); *C22C 30/00* (2013.01); *B22F 2301/30* (2013.01); *B22F 2304/058* (2013.01); *B22F 2304/10* (2013.01); *B22F 2998/10* (2013.01); *B22F 2999/00* (2013.01)

(58) Field of Classification Search
CPC ...................................................... B23K 35/26
See application file for complete search history.

(56) References Cited

U.S. PATENT DOCUMENTS

| | | | | |
|---|---|---|---|---|
| 2007/0227627 A1* | 10/2007 | Suh | ........................... | C22C 1/03 |
| | | | | 148/400 |
| 2013/0244037 A1* | 9/2013 | Hohman | ................. | B22F 9/082 |
| | | | | 428/402.2 |
| 2017/0014958 A1* | 1/2017 | Thou | ........................ | C22C 11/06 |

FOREIGN PATENT DOCUMENTS

JP 2018079480 A * 5/2018

OTHER PUBLICATIONS

Tevis, Ian D., Lucas B. Newcomb, and Martin Thuo. "Synthesis of liquid core-shell particles and solid patchy multicomponent particles by shearing liquids into complex particles (SLICE)." Langmuir 30.47 (2014): 14308-14313.*

* cited by examiner

*Primary Examiner* — Christopher S Kessler
(74) *Attorney, Agent, or Firm* — Conley Rose, P.C.; Michael W. Piper; Gayatry Nair

(57) ABSTRACT

Disclosed herein are a solder alloy composition comprising Sn—Bi—In base solder particles. The Sn—Bi—In base solder particles is characterized by having an average diameter less than 10 μm, and the Sn—Bi—In base alloy comprises 12-22% of Sn, 33-43% of Bi and 45-55% by weight. Also disclosed herein is a method for producing the Sn—Bi—In base solder particles. The method mainly includes the steps of, sintering a mixture comprising tin (Sn), bismuth (Bi) and indium (In) at a designated weight ratio to produce a bulk alloy; dissolving the bulk alloy to produce an alloy solution; and subjected the alloy solution to ultrasonication at a first temperature of about 65-85° C. and then cooling at a second temperature of about 0-25° C., thereby produces the present Sn—Bi—In base solder particles.

13 Claims, 7 Drawing Sheets

SOLDER ALLOY COMPOSITION, ITS PREPARATION METHOD AND USES IN ROOM-TEMPERATURE RAPID SOLID-STATE SOLDERING

CROSS-REFERENCES TO RELATED APPLICATIONS

This application claims priority and the benefit of U.S. Provisional Patent Application No. 63/388,125, filed Jul. 11, 2022, the entireties of which is incorporated herein by reference.

BACKGROUND OF THE INVENTION

1. Field of the Invention

The present disclosure relates to soldering technology. More particularly, the disclosed invention relates to a novel soldering material with an improved bonding property.

2. Description of Related Art

In a 3D integrated circuit (3D IC), conventional solder joint technology typically relies on the solid-liquid interdiffusion (SLID) reaction, in which the solder alloy is in the liquid state and the Cu substrate is in the solid state. To enable the SLID reaction, the reaction temperature must be above the melting point of the solder alloy. However, since the melting point of the solder alloys (e.g., Sn—Ag alloy) is typically above 200° C., and the soldering temperature is even higher, thus, conventional soldering is basically inoperable at room temperature.

On the other hand, as the size of interconnected components in 3D ICs continues to shrink, there are several challenges that must be addressed in order to make reliable solder joints in micron ranges. One of the major challenges is the difficulty in preparing uniform small solder particles. Current methods for preparing such particles, including high-energy ball milling, mechanical crushing, centrifugal atomization, chemical reduction, and laser processing, have limitations in terms of cost, uniformity, and impurity control. These limitations make it challenging to create stable submicron-sized solder particles required for micro-bumps. Another challenge is to control the shape of the liquid solder phase during reflow, which can lead to the protrusion of the solder layer in micro-bumps and limit the yield during assembly.

To overcome these challenges, ultrasonic vibration (USV) is developed for the preparation of small and uniform solder particles, therefore can be used to form spherical nanoparticles of low-melting metals. However, only a limited number of studies have focused on developing multi-alloy solder particles and their practical applications. Despite these efforts, no substantial progress has been made in this area.

In view of the foregoing, there exists in the related art a need of an improved solder material that facilitates bonding at lower temperatures (e.g., about 60° C.) and enables the creation of solder joints in micron ranges.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, the purpose of the present disclosure is to provide a solder alloy composition comprising a plurality of solder particles of a Sn—Bi—In base alloy, and a method for producing the solder particles. Each solder particle is characterized in having a diameter less than 10 μm, such that the bonding between substrates and solder particles can be improved.

In one aspect, the present disclosure is directed to a solder alloy composition comprising a plurality of solder particles of a Sn—Bi—In base alloy, in which each solder particles is less than 10 μm in diameter, and the Sn—Bi—In base alloy comprises 12-22% of Sn, 33-43% of Bi and 45-55% of In by weight.

According to some embodiments of the present disclosure, each solder particles is about 0.1 to 3 μm in diameter.

According to some other embodiments of the present disclosure, each solder particles is about 1 to 6 μm in diameter.

According to some alternative embodiments of the present disclosure, the Sn—Bi—In base alloy further comprises an element selected from the group consisting of Pb, Zn, and Ag.

In some working examples, the Sn—Bi—In base alloy further comprises the element Pb, accordingly, the Sn—Bi—In—Pb alloy consists essentially of 11-15% Si, 35-40% Bi, 39-52% of In, and 2-6% of Pb by weight.

In another aspect, the present disclosure pertains to a method for producing solder particles of a Sn—Bi—In base alloy, comprising: (a) sintering a mixture comprising tin (Sn), bismuth (Bi) and indium (In) to produce a bulk alloy having a melting point about 60-65° C.; (b) dissolving the bulk alloy of step (a) in an ethylene glycol solution containing polyvinylpyrrolidone (PVP) to produce an alloy solution; (c) subjecting the alloy solution of step (b) to ultrasonication at a first temperature of about 65-85° C. for 10 to 150 minutes to produce a suspension; and (d) cooling the suspension of step (c) to a second temperature of about 0-25° C. to produce the solder particles, wherein each solder particles is less than 10 μm in diameter, and the Sn—Bi—In base alloy comprises 12-22% of Sn, 33-43% of Bi and 45-55% of In by weight.

According to one embodiment of the present disclosure, the Sn, Bi, and In are present in the mixture at a ratio of about 1:1:2 to 1:3:5 by weight, more preferably, about 1:3:3 by weight.

In one preferred embodiment, the melting point of the bulk alloy of step (a) is about 62° C.

According to some embodiments of the present disclosure, the ultrasonication in step (c) of the present method is conducted at a frequency of 40 kHz and a power of 120 W for about 30 minutes.

According to some other embodiments of the present disclosure, the ultrasonication in step (c) of the present method is conducted at a frequency of 40 kHz and a power of 120 W for about 60 minutes.

According to still other embodiments of the present disclosure, the ultrasonication in step (c) of the present method is conducted at a frequency of 80 kHz and a power of 120 W for about 120 minutes.

Preferably, in step (c) of the present method, the ultrasonication is conducted at about 75° C.

According to preferred embodiments of the present disclosure, in step (d) of the present method, the suspension of step (c) is cooled by placing it in an ice bath until it reaches the second temperature of about 0° C.

According to some embodiments of the present disclosure, each Sn—Bi—In base solder particles is less than 10 μm in diameter.

According to other embodiments of the present disclosure, each Sn—Bi—In base solder particles is about 0.1 to 3 μm in diameter.

According to still other embodiments of the present disclosure, each Sn—Bi—In base solder particles is about 1 to 6 μm in diameter.

According to alternative embodiments of the present disclosure, in step (a) of the present disclosure, the mixture further comprises an element selecting from the group consisting of Pb, Zn, and Ag.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where.

Figure 1A:
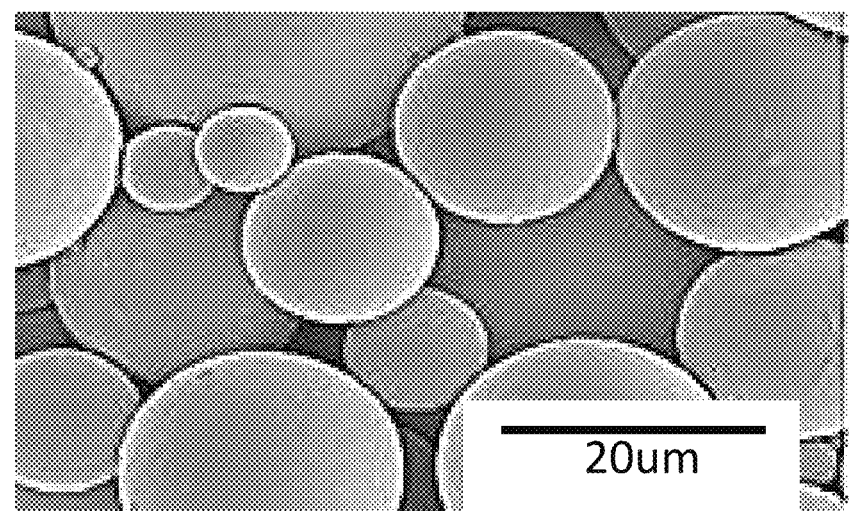
FIGS. 1A to 1C are SEM images respectively depicting microstructures of Sn—Bi—In base solder particles produced by different sonification conditions according to one embodiment of the present disclosure.

In accordance with common practice, the various described features/elements are not drawn to scale but instead are drawn to best illustrate specific features/elements relevant to the present invention. Also, like reference numerals and designations in the various drawings are used to indicate like elements/parts.

DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

1. Definition

For convenience, certain terms employed in the specification, examples and appended claims are collected here. Unless defined otherwise, all technical and scientific terms used herein have the same meaning as commonly understood by one of the ordinary skill in the art to which this invention belongs.

The singular forms "a", "and", and "the" are used herein to include plural referents unless the context clearly dictates otherwise.

Values expressed in a range format should be interpreted in a flexible manner to include only the numerical values explicitly recited as the limits of the range but also to include all the individual numerical values or sub-ranges encompassed within that ranges as if each numerical value and sub-range is explicitly recited. For example, a size of "about 0.1-3 μm in diameter" should be interpreted to include not only the explicitly recited diameter range of about 0.1 μm to about 3 μm, but also the individual diameters (e.g., 1%, 2%, and 3%) and the sub-ranges (e.g., 0.1 to 0.5 μm, 1.1 to 2.2 μm, etc) within the indicated range. A weight ratio of "about 10-15 wt. %" should be interpreted to include not only the explicitly recited weight ratio range of about 10 wt. % to about 15 wt. %, but also the individual weight ratio (e.g., 11 wt. %, 12 wt. %, 13 wt. %, and 14 wt. %), and the subranges (e.g., 10.1 to 10.5 wt %, 11.1 to 12.2 wt. %, 13.3 to 14.4 wt. %, etc) within the indicated range.

The term "about" as used herein allows for a degree of variability in a value or range, for example, within 10%, within 5%, within 1%, within 0.5%, within 0.1%, or within 0.01% of a stated value or of a stated limit of a range. Alternatively, the term "about" means within an acceptable standard error of the mean when considered by one of ordinary skill in the art. Accordingly, unless indicated to the contrary, the numerical parameters set forth in the present disclosure and attached claims are approximations that can vary as desired.

The term "solder particles of a Sn—Bi—In alloy" or "Sn—Bi—In base solder particles" used herein interchangeably refers to the present solder particles made of at least three elements of tin (Sn), bismuth (Bi) and indium (In) by the present method, which is characterizing in ultrasonicating an alloy solution at suitable conditions as set forth in working examples of the present disclosure.

The terms "sonochemistry" or "sonochemical reaction" as used herein refers to a reaction involving using ultrasound to form acoustic cavitation in liquids, thereby leading to the initiation or enhancement of the chemical activity in the solution. Hence, the chemical effects of ultrasound do not come from a direct interaction of the ultrasonic sound wave with the molecules in the solution. Thus, the term "ultrasonication", "ultrasound treatment," and "ultrasonic treatment" are interchangeably used herein to refer a process where above 20 kHz of ultrasonic rates/frequencies are utilized.

2. Description of the Invention

The present disclosure is based, at least in part, on the discovery that solder paste with micron-size particles can be produced by subjecting an alloy to ultrasonication at suitable condition (e.g., via changing temperature). Accordingly, the present disclosure provides a method for producing Sn—Bi—In base solder particles via ultrasonication at a first temperature and cooling at a second temperature, thus the produced Sn—Bi—In base solder particles independently has an average diameter of less than 10 μm. Also disclosed herein is a solder alloy composition comprising the present Sn—Bi—In base solder particles.

2.1 Sn—Bi—In Base Solder Particles and their Preparation Methods

The present disclosure aims at providing a solder alloy composition comprising Sn—Bi—In base solder particles, in which each particle is less than 10 μm in diameter.

According to embodiments of the present disclosure, the present Sn—Bi—In base solder particles are produced by, (a) sintering a mixture comprising tin (Sn), bismuth (Bi) and indium (In) to produce a bulk alloy having a melting point of about 60-65° C.;

(b) dissolving the bulk alloy of step (a) in an ethylene glycol solution containing polyvinylpyrrolidone (PVP) to produce an alloy solution;

(c) ultrasonicating the alloy solution of step (b) at a first temperature of about 65-85° C. for 10 to 150 minutes to produce a suspension; and (d) cooling the suspension of step (c) to a second temperature of about 0-25° C. to produce the Sn—Bi—In base solder particles.

The Sn—Bi—In base solder particles of the present disclosure are characterized in having a homogenous submicron particle size, specifically, each particle is less than 10 μm in diameter. To forming homogenous particles, a bulk alloy is ultrasonicated at a first temperature to form a suspension, which is subsequently cooled to a second temperature, thereby achieving uniform size distribution among the thus produced particles.

According to embodiments of the present disclosure, in step (a), at least tin (Sn), bismuth (Bi), and indium (In) are mixed at a designated weight ratio to produce a mixture, which is then sintered to produce a bulk alloy comprising at least, the elements of Sn, Bi, and In. Preferably, the Sn, Bi and In are mixed at a weight ratio ranging from about 1:1:2 to about 1:3:5; more preferably, the Sn, Bi and In are mixed at a weight ratio of about 1:3:3. The mixture is sintered via procedures and/or tools well known in the art, as long as the process involves a thermal and pressured environment where atoms of the materials diffuse across the particle boundaries and fuse together into one piece. In one working example, the mixture is sintered at 600-800° C. for 1 to 3 hours. According to some embodiments of the present disclosure, the thus produced bulk alloy has a melting point of about 60-65° C. such as about 60° C. In one preferred embodiment, the bulk alloy is produced by mixing Sn, Bi, and In at the weight ratio of about 1:3:3, and has a melting point of about 62° C.

In an alternative or optional embodiment of the present disclosure, in step (a), the mixture may further comprise an element other than Sn, Bi, or In. Specifically, one or more additional elements can be added with Sn, Bi, and In, to form the mixture. The element may be selected from the group consisting of Pb, Zn, and Ag. Preferably, the element is Pb, in such case, Sn, Bi, In and Pb are mixed at a weight ratio of 1:1:2:0.1 to 1:3:5:0.5 to form a mixture.

The bulk alloy produced in step (a), with or without the inclusion of additional elements (e.g., Pb), is then dissolved in a polar solvent, in which a dispersing agent and/or stabilizer may be present, so as to produce an alloy solution (step (b)). Examples of the polar solvent suitable for use in the present method include, but are not limited to, ethylene glycol (EG), dimethyl sulfoxide (DMSO), trifluoroethanol, hexafluoroisopropanol and the like. Examples of the dispersing agent and/or stabilizer suitable for use in the present method include, but are not limited to, polyvinylpyrrolidone (PVP), polyethylene glycol (PEG) and the like. According to preferred embodiments of the present disclosure, the bulk alloy of step (a) is dissolved in ethylene glycol containing (PVP (i.e., the dispersing agent). A skilled person in the art may be easily determine the amounts of the polar solvent and dispersing agent needed to dissolve the bulk alloy of step (a) through routine experimentation. In one preferred embodiment, 0.1 g of the bulk alloy is dissolved in 30 mL of ethylene glycol supplemented with 0.5 g of PVP.

The alloy solution of step (b) is then ultrasonicated at a first temperature of about 65-85° C. for 10 to 150 minutes to produce a suspension (step (c)). Specifically, the alloy solution is placed in a sealed vessel and ultrasonicated in a heated water bath. According to some embodiments of the present disclosure, the water bath is heated to a first temperature of approximately 65 to 85° C., as long as it is substantially higher than the melting point of the bulk alloy. According to one embodiment of the present disclosure, the ultrasonication is conducted at a frequency of 40 kHz to 80 kHz, and a power of 120 W for about 10 to 150 minutes. In one working example, the ultrasonication is conducted at a frequency of 40 kHz and a power of 120 W for about 30 minutes. In another working example, the ultrasonication is conducted at a frequency of 40 kHz and a power of 120 W for about 60 minutes. In still another working example, the ultrasonication is conducted at a frequency of 80 kHz and a power of 120 W for about 120 minutes. According to preferred embodiments of the present disclosure, the alloy solution of step (a) is ultrasonicated at about 75° C. for about 10-150 minutes until a suspension containing the present Sn—Bi—In base alloy is produced.

The suspension of step (c) is then cooled to a second temperature of about 0-25° C. to precipitate the solder particles (step (d)). The suspension of step (c) can be cooled by any means/tools well known in the art. In some embodiments, the suspension is let stand still until the temperature drops to room temperature. Optionally or alternatively, the suspension is cooled by placing it in an ice bath until the temperature reaches 0° C. In one working example, the suspension is placed in the ice-water bath of 0° C. for 10 minutes to precipitate the desired solder particles. In addition, or optionally, the present method further includes washing the thus-produced solder particles with deionized water and ethanol, and/or drying the thus-produced solder particles in a vacuum-dried oven.

According to embodiments of the present disclosure, the thus produced Sn—Bi—In base solder particles are characterized in having a particle size that is less than 10 μm in diameter, such as, less than 6 μm, less than 3 μm, less than 1 μm, or less than 0.1 μm. In some embodiments, each Sn—Bi—In base solder particles is about 0.1 to 3 μm in diameter. In other embodiments, each Sn—Bi—In base solder particles is about 1 to 6 μm in diameter.

2.2 Composition

Another aspect of the present disclosure is directed to a solder alloy composition comprising a plurality of solder particles of a Sn—Bi—In base alloy described herein. Specifically, the plurality of solder particles of Sn—Bi—In base alloy are prepared by the present method set forth above, and each solder particles is less than 10 μm in diameter. Preferably, each solder particles contained in the present solder alloy composition is about 0.1 to 6 μm in diameter; more preferably, each solder particles is about 0.1 to 3 μm in diameter.

In some embodiments of the present disclosure, the Sn—Bi—In base alloy comprises 12-22% of Sn, 33-43% of Bi and 45-55% of In by weight. Preferably, the Sn—Bi—In base alloy comprises 14% of Sn, 39% of Bi and 47% of In by weight.

Alternatively or in addition, the Sn—Bi—In base alloy may further comprise an additional element. Examples of the additional elements suitable for being included in the present alloy include, but are not limited to, Pb, Zn, and Ag. According to preferred embodiments of the present disclosure, the element is Pb, and the Sn—Bi—In—Pb alloy consists essentially of 11-15% Si, 35-40% Bi, 39-52% of In, and 2-6% of Pb by weight.

In some embodiments, the solder alloy composition may be in the form of a paste (i.e., a solder paste composition), which can be prepared by any method known in the art of semiconductor industry. Formation of a paste typically includes steps of mixing alloy solder powders (e.g., the present Sn—Bi—In base solder powders), flux, binders, and, if necessary, a solvent, to create a homogeneous paste. The solder paste is then typically vacuumed to remove any trapped air bubbles. The thus-produced solder paste composition can be further tested to verify its viscosity and performance, according to practical needs. According to embodiments of the present disclosure, the alloy solder powders are Sn—Bi—In base solder powders, which are preferably composed of a plurality of the present Sn—Bi—In base solder particles, wherein each solder particles is less than 10 μm in diameter. Examples of the flux suitable for used in the present solder paste composition typically includes, but are not limited to, resin, organic acids (such as citric acid or hydrochloric acid), and inorganic compounds (e.g., halogens). Examples of binder suitable used in the present solder paste composition include, but are not limited to, resins, phthalates, glycols, cellulose, acrylic polymers, and the like. Additionally or alternatively, a solvent is added to adjust the viscosity of the solder paste. The solvent suitable for use in the present disclosure is typically a low-boiling point organic compound that evaporates quickly when heated, for example, ethanol.

The amounts of the present Sn—Bi—In base solder particles, flux, binders, and/or solvent required to produce the present solder alloy composition will vary, depending upon on the intended application, the type of substate being used, and the storage conditions. According to embodiments of the present disclosure, the solder alloy composition may comprise 50% to 99% of the present Sn—Bi—In base solder particles by weight. In one working example, the solder alloy composition comprises 50% of the present Sn—Bi—In base alloy solder particles. In another working example, the solder alloy composition comprises 90% of the present Sn—Bi—In base alloy solder particles.

By the virtue of the above features, the present application provides an improved solder alloy composition containing Sn—Bi—In base solder particles respectively about submicron in sizes and are useful for enhancing 3D IC packaging.

EXAMPLES

Materials and Methods

Preparation of the Present Sn—Bi—In Base Solder Particles

Powders of tin (Sn), bismuth (Bi), indium (In) and any of lead (Pb), zinc (Zn), and silver (Ag) were mixed at a weight ratio of 13.5:37.5:45:4 to produce a mixture, which was sintered at 600-800° C. for 1 to 3 hours to give a quaternary Sn—Bi—In-based bulk alloy. The bulk alloy of 0.1 g was put into a test tube containing 30 ml of ethylene glycol solvent and 0.5 g of PVP powders, and stirred for 10 min until the PVP powders dissolved completely. The sealed-tube was then placed into an ultrasonic machine and ultrasonicated at 75° C. for either 30 min, 60 min, or 120 min. Note that the power of the ultrasonic machine was set at 120 W with a frequency of 40 kHz or 80 kHz. The test tube was cooled to room temperature, then placed in an ice-water bath at about 0° C. for 10 minutes to produce a precipitate. The thus-produced precipitate was washed with deionized water and ethanol, and dried in a vacuum-dried oven for 60 minutes to give the present Sn—Bi—In base solder particles.

Bonding with Substrate Via the Present Sn—Bi—In Base Solder Particles

Pure Cu sheets (99% purity, 10 mm×10 mm×2 mm) were first polished by diamond paste (2.5 and 0.5 μm), the polished Cu sheets were ultrasonically cleaned in sequence with acetone, deionized water, and 5.0 vol % hydrochloric acid to remove residual oil and oxidation, followed by additional ultrasonication in deionized water and absolute ethanol for further 3 minutes. 50 mg of flux and 50 mg of solder particles were placed on the surface of the copper sheet. The solder joints were fabricated by a reflow process, where the samples were reflowed at 100° C. for 5 min to form the solder joints.

To produce the sandwiched Cu/solder particles/Cu structure, the Sn—Bi—In base particles were dispersed in ethanol and then subjected to ultrasonic dispersion with carboxylic acid for 20 minutes. The resulting dispersion was then dropped onto a 10×10 mm Cu sheet. After drying, another cleaned Cu plate was placed on top of the Cu-solder particles, forming the sandwiched structure. Pressure bonding experiments were conducted at room temperature by applying 20 MPa of pressure for 5 minutes.

Characterization

The surface morphology and distribution of samples were observed using field emission scanning electron microscopy (SEM, Regulus 8230), and elemental mapping was characterized via detector XFlash 6130. The crystal structures and purity of the samples were recorded using x-ray diffraction (XRD, Rigaku Corporation, Ultima IV diffractometer). Thermal measurements of the prepared solder particles were performed using thermal analysis instrument (Q1000 differential scanning calorimeter (DSC)) at a scan rate of 10 K/min to analyze and to identify changes in melting points.

For cross-sectional inspection, the samples were all embedded in epoxy resin and polished with water abrasive paper (800 #, 1000 #, 2000 #), followed by diamond polishing solution (2.5 μm, 0.5 μm), and finally cleaned with deionized water for 1 min. Scanning electron microscopy (SEM, Regulus 8230) was used to analyze the fracture surface and interfacial microstructure of solder joints. Energy dispersive x-ray spectroscopy (EDS) was used to confirm the composition in the Sn—Bi—In-base/Cu interfaces. Then, the shear tester (PTR-1101, RHESCA, Japan) to evaluate the mechanical properties of the solder joints with a shear speed of 5 mm/s. To further investigate the fracture mode and to determine the phase in the solder joint, the shear samples were immediately characterized by SEM and EDS.

The thickness and wettability of the IMC layer were measured according to the standard JIS Z3198-3. The thickness of the IMC layer was identified using the cross section (SEM image). Also, the area (A) of the IMC layer in the SEM image was measured and divided by its width (L) to calculate the IMC thickness. θ, A and L were carefully measured using Image J software. The contact Angle and IMC layer thickness data presented in this study are averages of five different regions of the three solder joints.

Shear Test

The samples were fixed on the uniaxial shear test equipment, with jig 155 μm away from the bigger substrate. When the shear test began, the jig moved towards the solder joint at a rate of 2 mm/min until the solder joint was completely fractured. The strain rate of the shear test was $6.6 \times 10^{-3}$ $s^{-1}$, the whole process was performed at ambient temperature.

Example 1 Production and Characterization of the
Present Sn—Bi—In Base Solder Particles 1. Size of the Sn—Bi—In Particles The Sn—Bi—In base solder particles were produced in accordance with procedures described in "Materials and Methods" section. Briefly, Sn—Bi—In-based bulk alloy was ultrasonicated at 75° C. with ultrasonic machine set at three different conditions to give three groups of Sn—Bi—In base solder particles: 40 kHz, 120 W for 30 minutes (Group I), 40 kHz and 120 W for 60 minutes (Group II), and 80 kHz and 120 W for 120 minutes (Group III). The cooling temperature for each groups was about 0° C. The present Sn—Bi—In base solder particles in each group were analyzed via SEM, DSC, ERD, and EDS, respectively. Results are provided in FIGS. 1 and 2.

Figure 1B:
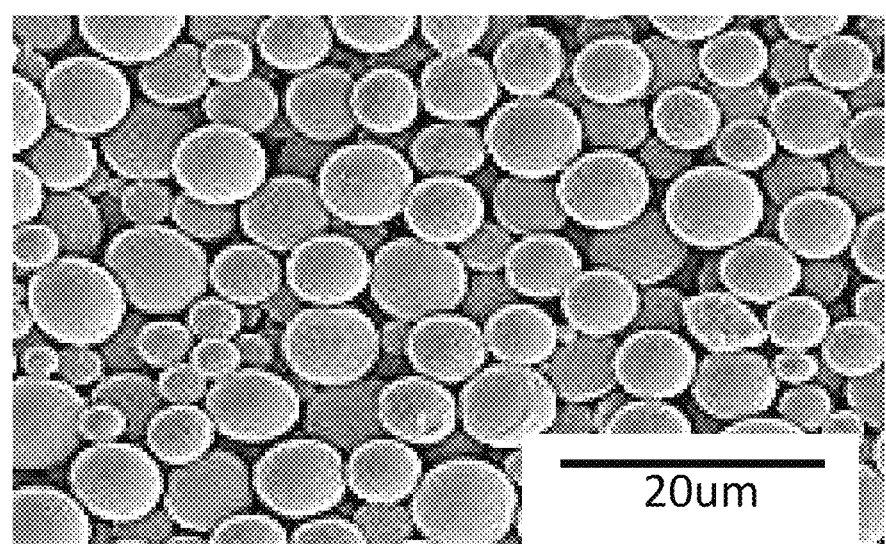
Figure 1C:
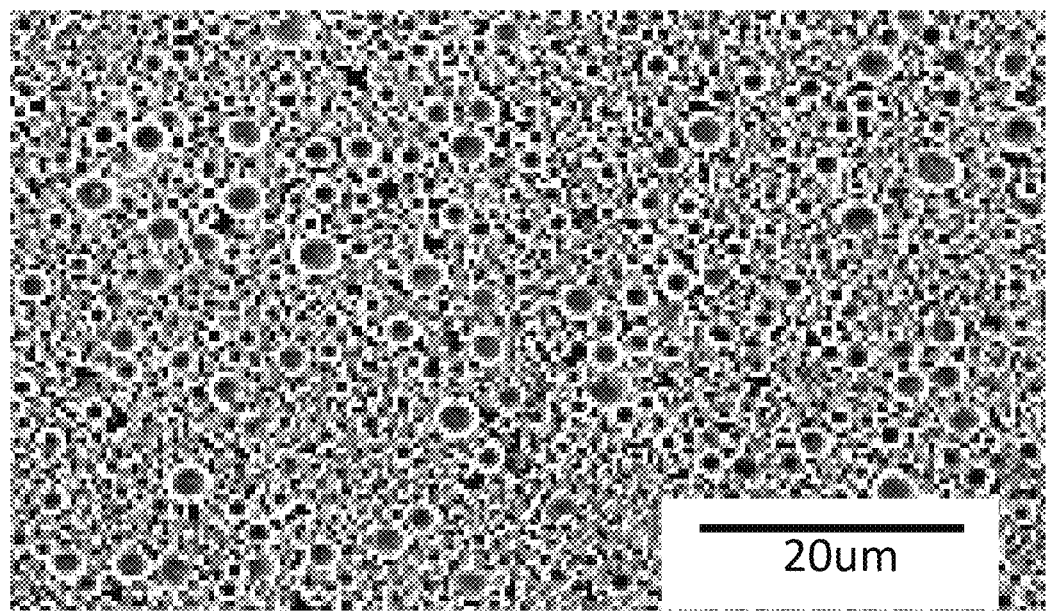
Figure 2A:
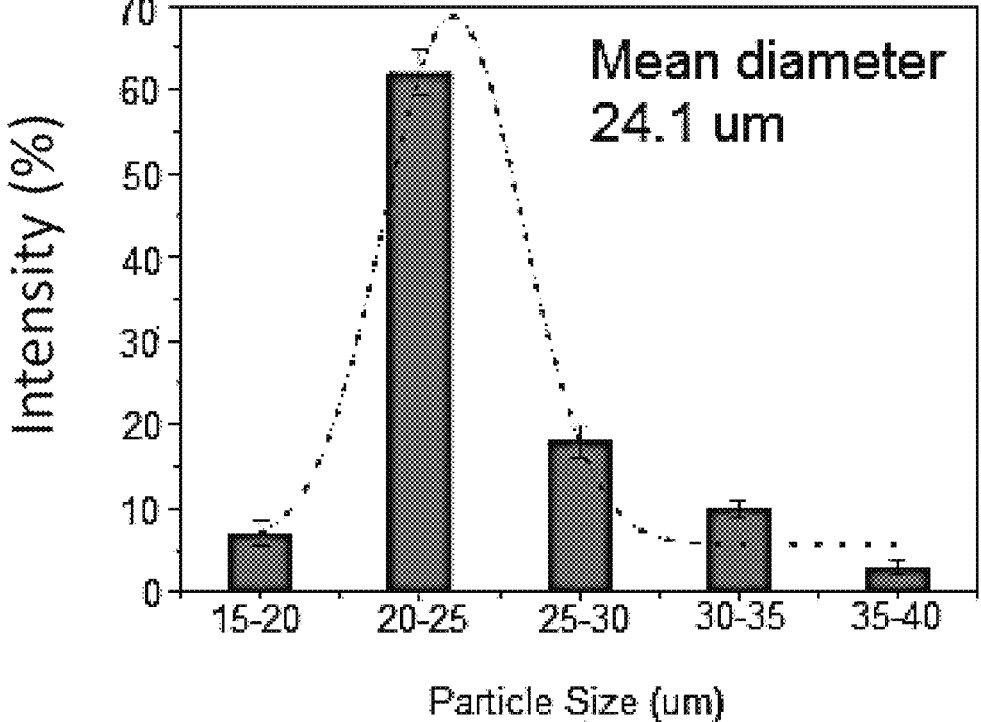
FIGS. 2A to 2C are bar graphs respectively depicting the diameters of the Sn—Bi—In base solder particles estimated from SEM images of FIGS. 1A to 1C.
Figure 2B:
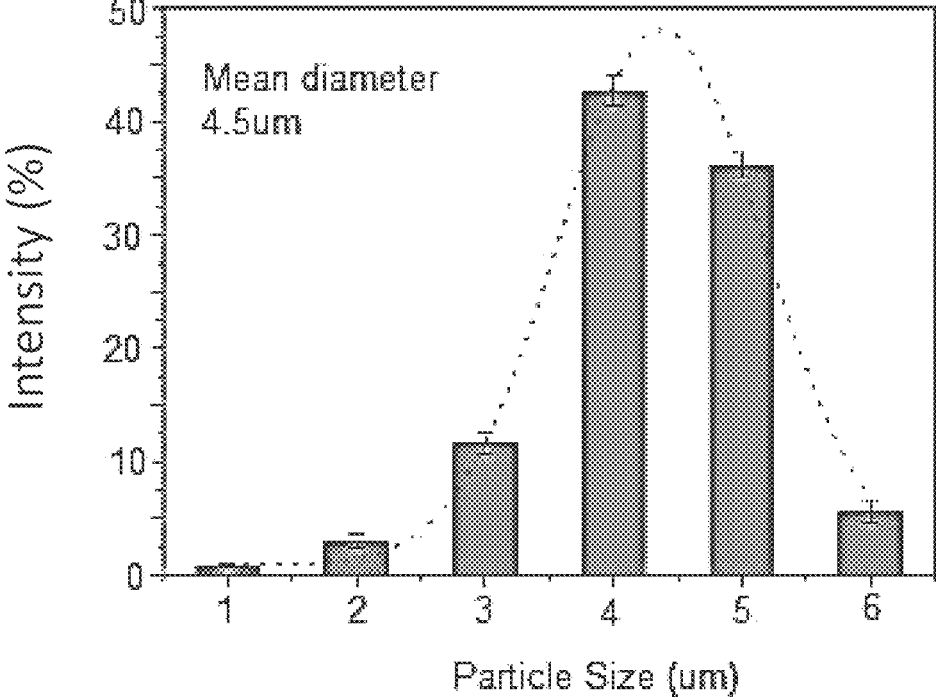
Figure 2C:
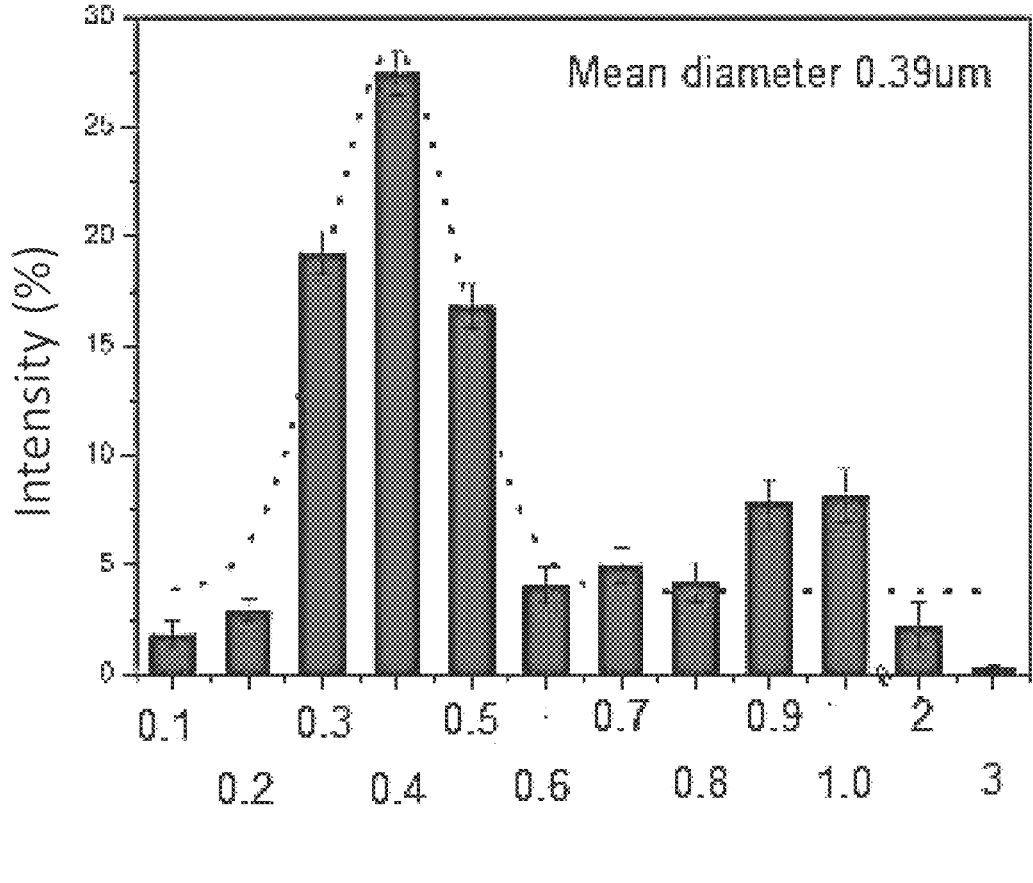

FIGS. 1A to 1C are SEM photographs of the three groups of Sn—Bi—In base solder particles produced by different ultrasonication conditions; and FIGS. 2A to 2C are bar graphs respectively depicting the quantified diameters of the Sn—Bi—In base solder particles estimated from the SEM images of FIGS. 1A to 1C. It was found that, under the same frequency (i.e., 40 kHz), the longer the ultrasonic duration, the smaller the solder particle size, even as small as less than 6 μm in diameter, as depicted in FIGS. 1B and 2B. Moreover, it was also found that, by increasing the frequency and duration of ultrasonication, particles with an average size of about 300-400 nm were produced (FIGS. 1C and 2C). The results collectively indicated that the sizes of solder particles could be adjusted according to one's need by varying the frequency and duration of ultrasonication. Further, the SEM photographs of FIGS. 1A to 1C also confirmed that the present Sn—Bi—In base solder particles independently possessed a good uniformity and smooth surface.

The XRD and EDS analysis (data not shown) also confirmed that of the Sn—Bi—In base solder particles in Groups I to III were predominantly composed of free Sn, BiIn, BiIn$_2$, and Bi$_3$In$_5$ crystal phases, and all the elements of Sn, Bi, and In were evenly distributed in each particles, even in the solder particles that were less than 1 μm in diameter.

Further, DSC analysis confirmed that the peak temperature of the solder particles ranged from 61.36° C. to 61.64° C., which was lower than that of the bulk solder alloy (i.e., 62° C.). This finding further suggested that the spherical particles could decrease the melting point of the same alloy.

2. Bonding with Cu Substrates

Figures 3A, 3B:
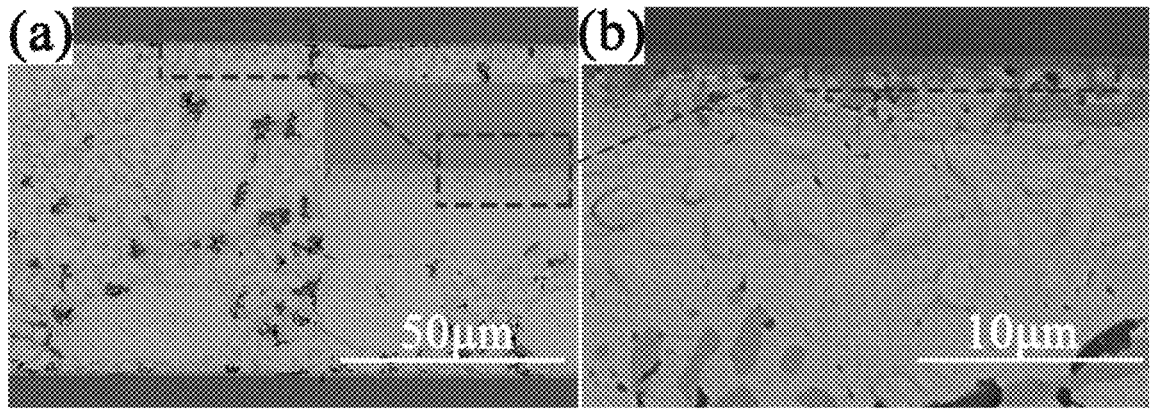
FIGS. 3A and 3B are SEM images depicting a cross-section of the Cu/solder particles/Cu structure under different magnification according to one embodiment of the present disclosure.

In this example, whether the Sn—Bi—In base solder particles of the present disclosure capable of effectively bonding with a copper substrate was investigated. To this purpose, the flux added with and without 50 mg of the present Sn—Bi—In base solder particles were respectively placed on the Cu sheet, then a sandwiched Cu/solder particles/Cu structure was produced under a bonding pressure of MPa at room temperature for 5 minutes in accordance with procedure set forth in "Materials and Methods" section. Microstructures of Sn—Bi—In base solder particle-bond Cu substrate were examined by SEM, which are provided in FIGS. 3 and 4. The shear strength of solder joints was evaluated by reflowing with bulk solder or solder particles.

Figure 4:
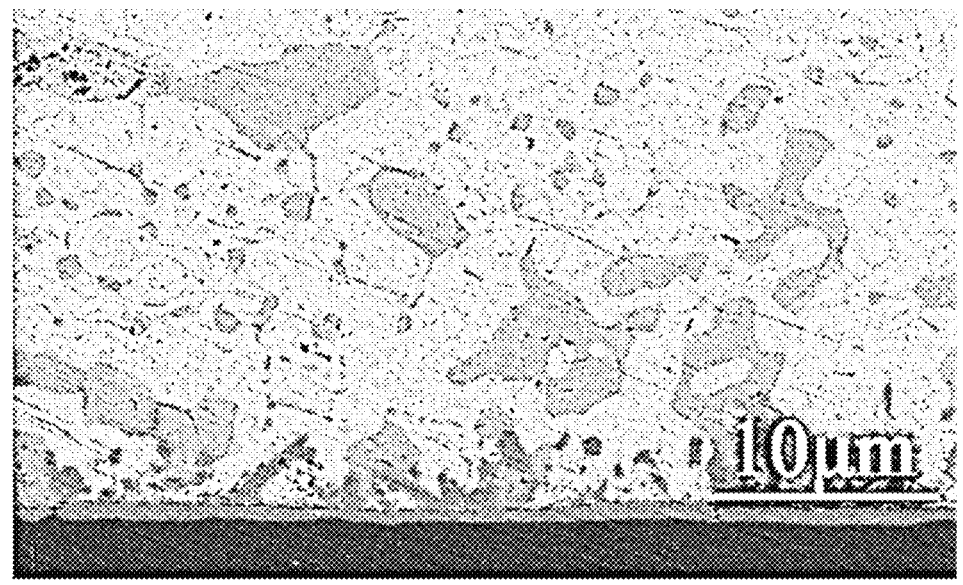
FIG. 4 are SEM images taken at different magnification revealing a microstructure of the present Sn—Bi—In base solder particles reacted with Cu substrate according to one embodiment of the present disclosure.

Interfacial interaction was found on the interface between Cu substrate and the present Sn—Bi—In base solder particles. As revealed in the SEM photographs in panels (a) and (b) of FIG. 3, the microstructure revealed the formation of Cu$_6$Sn$_5$ intermetallic compound (IMC) on the surface of Cu under 20 MPa pressure for 5 minutes (as denoted by boxes). Further, the microstructure formed after the reaction between submicron Sn—Bi—In base solder particles and Cu substrate is provided in FIG. 4. As shown in FIG. 4, a dense and uniformly distributed network structure was formed between the interface of Sn—Bi—In base solder particles and Cu substrate. This network-like microstructure may be beneficial in improving the mechanical properties of the solder joints.

Further, the results of shear test showed that the addition of the present Sn—Bi—In base solder particles in the flux increased the shear strength. The bulk solder joint had a shear strength of 33.52 MPa (±1.5 Mpa), while the uniform and small-sized solder particles treated joint had a significantly higher shear strength of 36.93 MPa (±1.5 Mpa), which was 9% higher than that of bulk solder. This indicated that the uniform solder particles prepared by ultrasonication could effectively enhance the mechanical properties of solder joints.

These data collectively demonstrated that the sizes of the Sn—Bi—In base solder particles could be precisely controlled via the combined treatment of ultrasonication and ice-water bath cooling. Moreover, the thus-produced Sn—Bi—In base solder particles were capable of bonding two Cu substrates at room temperature within a short time, thereby greatly reducing the manufacturing cost and increasing industrial throughput. As a result, the alloy of the present disclosure has promising applications in terms of the manufacture of advanced semiconductor devices, such as 3D IC packaging.

It will be understood that the above description of embodiments is given by way of example only and that various modifications may be made by those with ordinary skill in the art. The above specification, examples, and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method for producing solder particles of a Sn—Bi—In base alloy, comprising:
   (a) preparing a mixture comprising tin (Sn), bismuth (Bi) and indium (In) to produce a bulk alloy, in which the bulk alloy has a melting point of about 60-65° C.;
   (b) dispersing the bulk alloy of step (a) in an ethylene glycol solution containing polyvinylpyrrolidone (PVP) to produce an alloy solution;
   (c) subjecting the alloy solution of step (b) to ultrasonication at a first temperature of about 65-85° C. for 10 to 150 minutes to produce a suspension; and
   (d) cooling the suspension of step (c) to a second temperature of about 0-25° C. to produce the solder particles of the Sn—Bi—In base alloy;
   wherein, each of the solder particles is less than 10 μm in diameter, and the Sn—Bi—In base alloy comprises 12-22% of Sn, 33-43% of Bi and 45-55% of In by weight.

2. The method of claim 1, wherein the Sn, Bi, and In are present in the mixture at a ratio of about 1:1:2 to about 1:3:5 by weight.

3. The method of claim 2, wherein the Sn, Bi, and In are present in the mixture at a ratio of about 1:3:3 by weight.

4. The method of claim 1, wherein the melting point of the bulk alloy of step (a) is about 62° C.

5. The method of claim 1, wherein in step (c), the ultrasonication is conducted at a frequency of 40 KHz and a power of 120 W for about 30 minutes.

6. The method of claim 1, wherein in step (c), the ultrasonication is conducted at a frequency of 40 KHz and a power of 120 W for about 60 minutes.

7. The method of claim 1, wherein in step (c), the ultrasonication is conducted at a frequency of 80 KHz and a power of 120 W for about 120 minutes.

8. The method of claim 1, wherein in step (c), the ultrasonication is conducted at about 75° C.

9. The method of claim 1, wherein in step (d), the suspension of step (c) is cooled by placing it in an ice bath until it reaches the second temperature of about 0° C.

10. The method of claim 1, wherein each of the solder particles of Sn—Bi—In base alloy is less than 10 μm in diameter.

11. The method of claim 10, wherein each of the solder particles of Sn—Bi—In base alloy is about 0.1 to 3 μm in diameter.

12. The method of claim 10, wherein each of the solder particles of Sn—Bi—In base alloy is about 1 to 6 μm in diameter.

13. The method of claim 1, wherein in step (a), the mixture further comprises Pb, Zn, or Ag.

\* \* \* \* \*